United States Patent [19]
Feltrop

[11] 3,982,661
[45] Sept. 28, 1976

[54] SEED PLANTER FOR INDIVIDUAL SEEDS

[76] Inventor: Floyd L. Feltrop, 203 E. Shawnee St., Paola, Kans. 66061

[22] Filed: Dec. 18, 1974

[21] Appl. No.: 533,991

[52] U.S. Cl.................................. 221/235; 111/77; 221/237
[51] Int. Cl.².................... A01C 7/18; B65H 5/00
[58] Field of Search.................... 222/217, 218, 221; 221/235, 237, 266, 253; 111/77, 78

[56] References Cited
UNITED STATES PATENTS

| 969,918 | 9/1910 | Streitz | 222/218 |
|---|---|---|---|
| 2,888,963 | 6/1959 | Guyer | 222/218 X |
| 3,561,380 | 2/1971 | Adams | 111/78 X |
| 3,636,897 | 1/1972 | Brink | 221/237 X |

FOREIGN PATENTS OR APPLICATIONS

| 68,343 | 4/1915 | Austria | 221/266 |
|---|---|---|---|
| 1,408,127 | 6/1965 | France | 221/253 |

Primary Examiner—Robert B. Reeves
Assistant Examiner—Francis J. Bartuska

[57] ABSTRACT

An improved seed planter; improvements in planting devices adapted to plant individual seeds one by one, at spaced intervals in a prepared furrow; improved mechanism for individually receiving seeds one by one each in a moving receptacle, retaining each seed in its receptacle as it is moved to planting position and then ejecting the seeds from the receptacles one by one in timed and spaced sequence; improved seed feeding apparatus for continuously receiving seeds for planting from a source (i.e. a hopper), arranging them individually in sequence and feeding them in sequence to individual receptacles of a planting device; an improved seed planter module incorporating a furrow cutter, seed storing, feeding and planting apparatus, furrow closing apparatus and furrow tamping apparatus.

3 Claims, 4 Drawing Figures

SEED PLANTER FOR INDIVIDUAL SEEDS

PRIOR ART

Applicant is aware of the following prior art U.S. Pat. Nos. references showing seed planter of various types:

Clark 289,222, issued Nov. 27, 1883 for "Corn Planter";

McCollister 726,972 issued May 5, 1903 for "Onion Setter";

Rockwell 912.891, issued Feb. 16, 1909 for "Seed Planter;"

Thurmond 924,204, issued June 8, 1909 for "Cotton Planter"; and

Rounds 2,587,386 issued Feb. 26, 1952 for "Corn Planter."

OBJECTS OF THE INVENTION

An object of the instant invention is to provide an improved seed planter which, in different sized versions thereof, is adapted to the planting of the seeds of different crops specifically incuding, for example, soy beans, milo, corn and wheat.

Another object of the invention is to provide an improved seed planting device which comprises an integrated apparatus which, in a module thereof, produces an individual furrow for seeding, plants individual seeds at regular and precisely spaced intervals in the furrow, closes the furrow after seeding and, finally tamps the closed, seeded furrow.

Another object of the invention is to provide such an improved seed planter wherein substantially any desired number of modules thereof may be mounted on the draw bar of a tractor, laterally spaced from one another as predetermined and desired for optimum seeding of a particular crop, with the set of seed planter modules mounted on the draw bar vertically adjustable as a group for achievement of the optimum depth of seeding.

Another object of the invention is to provide an improved seed planter having improved seed feeding means positioned within and cooperating with the seed carrying hopper for positive, sure, metered feed of seeds to the planting means, thereby to provide absolute assurance of continuous feed of seeds to the planting means and continuous seeding therefrom into the ground at spaced intervals.

Another object of the invention is to provide a greatly improved precision seed planting apparatus and device which is exceedingly simple, strong and rugged in use, long lived, possessing a minimum number of operating parts in order to do the tasks required, wherein the operating parts are protected and housed in use to avoid clogging or contamination by dust, soil, liquids or the like, yet wherein all of the parts of the apparatus are readily accessible for cleaning, repair or replacement.

An object of the invention is to provide an improved seed planter having an operating configuration which enables corn to be planted precisely and consistently edgewise in the ground whereby to obtain a greater yield in the crop.

Another object of the invention is to provide an improved seed planting device which, by positively pressing the seed into firm soil ensures that the seeds are not inadvertently planted in aerated, loose soil, whereby to increase the number of plants which will come up through the ground surface.

Another object of the invention is to provide an improved seed planting device which invariably provides the combination of features of precise spacing of seeds planted with respect to one another, uniform planting of single seeds, positive implantation of the seed in firm soil and, if desired, edge planting of the seed.

Another object of the invention is to provide an improved seed planting device which may be employed as a full sized planting device drawn behind a tractor or which yet is adaptable to a relatively small sized garden planter not requiring a mechanical draw or which is adaptable to draw by a small garden tractor.

Other and further objects of the invention will appear in the course of the following description thereof.

In the drawings, which form a part of the instant specification and are to be read in conjunction therewith, an embodiment of the invention is shown wherein, in the various views, like numerals are employed to indicate like parts.

Figure 1:
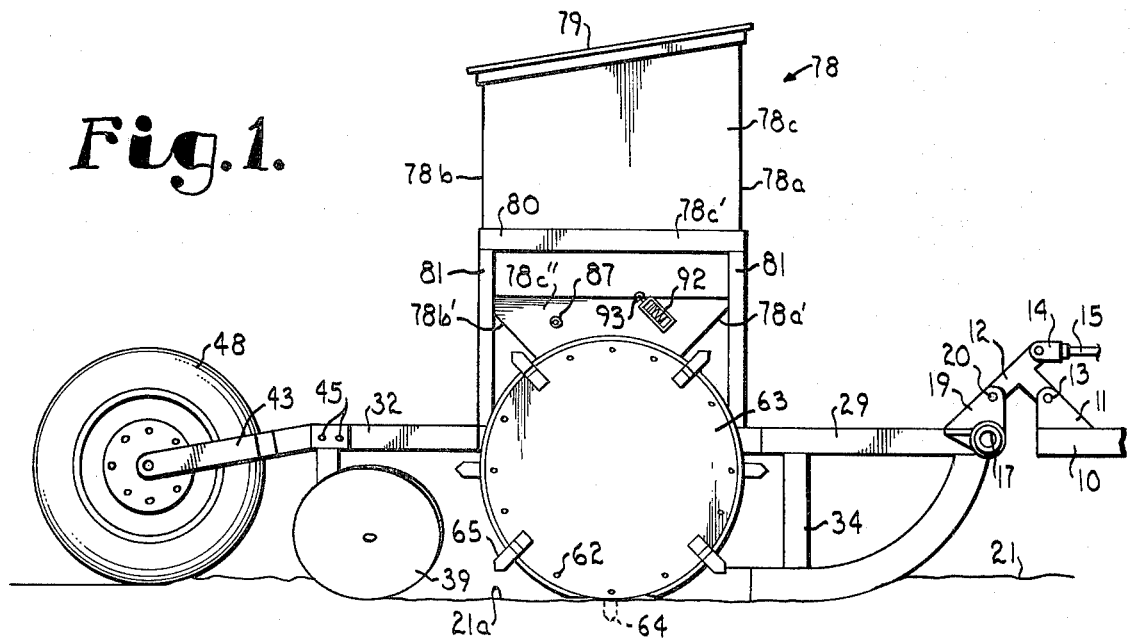
FIG. 1 is a side view of the subject planter showing the frame, the front furrow cutting runner, the seed planting device, per se, paired discs thereafter for restoring the furrow and, finally, the follower wheel which compacts the furrow.
Figure 4:
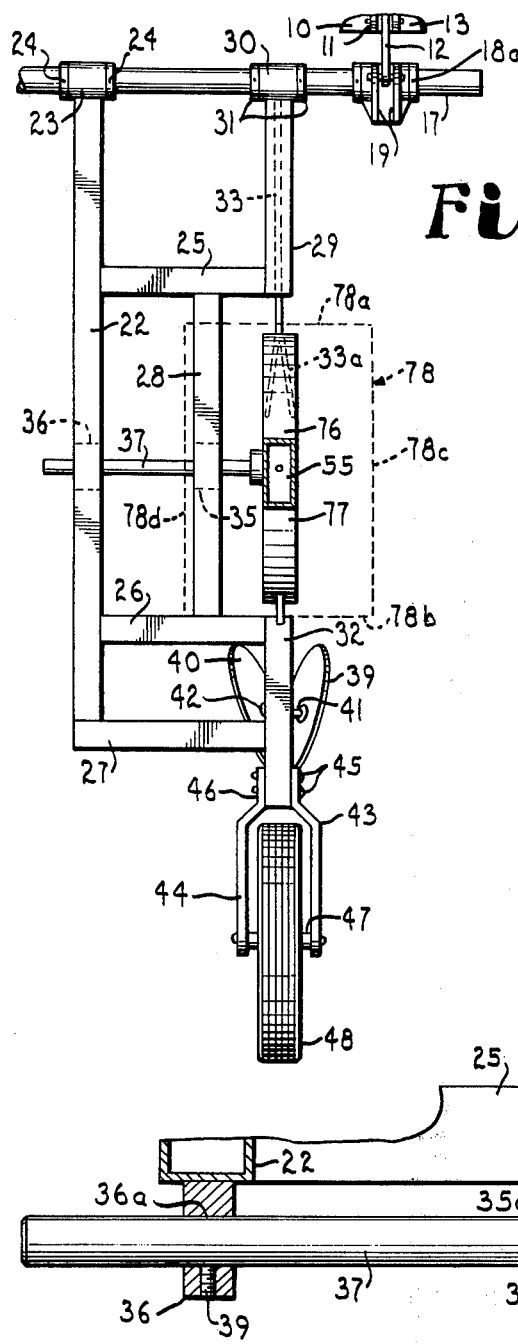
FIG. 4 is a vertical plan view, from above, of one complete module of the seeding device attached to the draw bar above a tractor, with the seed carrying hopper with its seed feed means deleted for clarity of illustration, the normal position of the hopper shown in dotted lines.

Referring to the drawings and most particularly to FIGS. 1 and 4, therein is shown a complete seeding apparatus or module. Basically, the entire functional seeding device, as seen in FIGS. 1 and 4 includes the following elements:

1. A frame, upon which the several elements are mounted or by which said elements are carried, the frame connectable or attachable to means for pulling it across the ground to be seeded, such as a tractor drawbar;

2. Means for cutting a furrow in the ground to be seeded;

3. Means following the furrow cutter for storing or holding seeds, feeding seeds from the storing means to the planter and means for individually and sequentially planting seeds;

4. Means for closing the furrow after planting the seeds therewithin; and

5. Means for tamping the furrow after closing.

It is recognized that it is not new to provide, in sequence, a furrow cutting means, seed planting means, furrow closing means and furrow tamping means. The instant improvements lie basically in the subject seed planting means, the seed receiving and feeding means, the seed feeding and planting means in their paired and cooperative association and the frame means which particularly carries these devices and, as well, in cooperation therewith, the furrow cutting, closing and tamping means.

A conventional tractor drawbar is schematically designated in the righthand portion of FIG. 1 and the upper portion of FIG. 4 at 10. Drawbar 10 is connected to a conventional tractor (the rear end thereof) in conventional manner. Bracket 11 is mounted on drawbar 10 and mounts T member 12 pivotally on said bracket by shaft or pin 13. Connector 14 (FIG. 1) is connected to rod 15 of an hydraulic cylinder or piston (not shown) and, at the other end thereof, is pivotally connected to one arm of T member 12 by pin or shaft 16.

Rearwardly (with respect to the frame pulling tractor) of drawbar 10 there is provided bar or beam 17, here shown as of hollow cylindrical shape. Collar 18 is mounted upon beam or bar 17 and removably fixed thereon by set screws 18a. Collar 18 has bracket 19 fixed or integrally formed therewith to which the other arm of T member 12 is removably and pivotally connected by shaft or pin 20. In action of the hydraulic cylinder having piston rod 15, it will be seen that movement of rod 15 to the right in FIG. 1 will tend to pivot T member 12 in a clockwise direction around pivot 13, thus raising bar 17 via bracket 19 and pin 20. When rod 15 moves to the left in the view of FIG. 1, T member 12 is pivoted in a counterclockwise direction around pin 13 in bracket 11 on drawbar 10, thus lowering beam or bar 17. Such action regulates the depth of furrow cut in the ground 21. There may be provided a plurality of brackets 11 and corresponding and cooperating brackets 19 on collars 18 along the length of bars 17 and 10, depending upon the number of seed planter modules employed or drawn by the tractor.

Other means than those just described may be used to hitch the seed planter modules (to be described) to a drawing or pulling vehicle and for raising and lowering same with respect to the vehicle.

Still referring to FIGS. 1 and 4, particularly, the frame carrying the above described elements of a planter module now will be described.

A first relatively longer longitudinal (in the direction of tractor movement) beam member 22 is mounted on bar 17 by collar 23, the latter having set screws 24 to fix same on beam 17. Front intermediate transverse beam member 25, rearward intermediate beam member 26 and rearmost transverse beam member 27 are connected, each at one end thereof, rigidly, to longitudinal beam member 22. Intermediate longitudinal beam member 28 is rigidly fixed at its front and rear ends, respectively, to intermediate transverse beam members 25 and 26. A second longitudinal beam member 29 has collar 30 fixed to the front end thereof mountable on beam 17 and fixable relative thereto with set screws 31. Front intermediate transverse beam member 25 connects the rear end of beam 29 to longitudinal beam member 22. Rear short longitudinal beam member 32 is connected at its front end to rear transverse intermediate beam member 26 and is rigidly fixed to rear transverse beam 27 intermediate its ends.

A conventional furrow cutting runner 33 or arcuate side configuration and divided rear configuration (the latter at 33a) is connected and fixedly attached at the front end thereof to beam 29 with vertical brace 34 connecting the rearward and lower end of furrow cutting runner 33 to the rearmost portion of longitudinal beam 29.

Mounting block 35 having opening 35a therethrough is welded or otherwise fixedly attached to the underside of longitudinal beam member 28. Like mounting block 36 having opening 36a therethrough is rigidly attached or welded to the underside of longitudinal beam 22. Elongate cylindrical, nonrotating shaft 37 is removably received through openings 35a and 36a in blocks 35 and 36, respectively, with set screws 38 and 39 fixing the positions of shaft 37 in said mounting blocks. Shaft 37 carries the seed planting means shown in detail in FIGS. 2 and 3 to be later described.

A pair of discs 39 and 40 are mounted under longitudinal beam member 32 and are fixed with respect thereto by supports 41 and 42, respectively.

Angled structurals 43 and 44 are fixed to the rear end of longitudinal beam member 32 by suitable rivets or bolts 45 and 46, mounting therebetween at the rear ends thereof shaft 47 on which is rotatably mounted wheel 48.

The seed planting device will now be described and, thereafter, the means for storing and carrying seeds and means for feeding seeds to the planter for planting.

Figure 2:
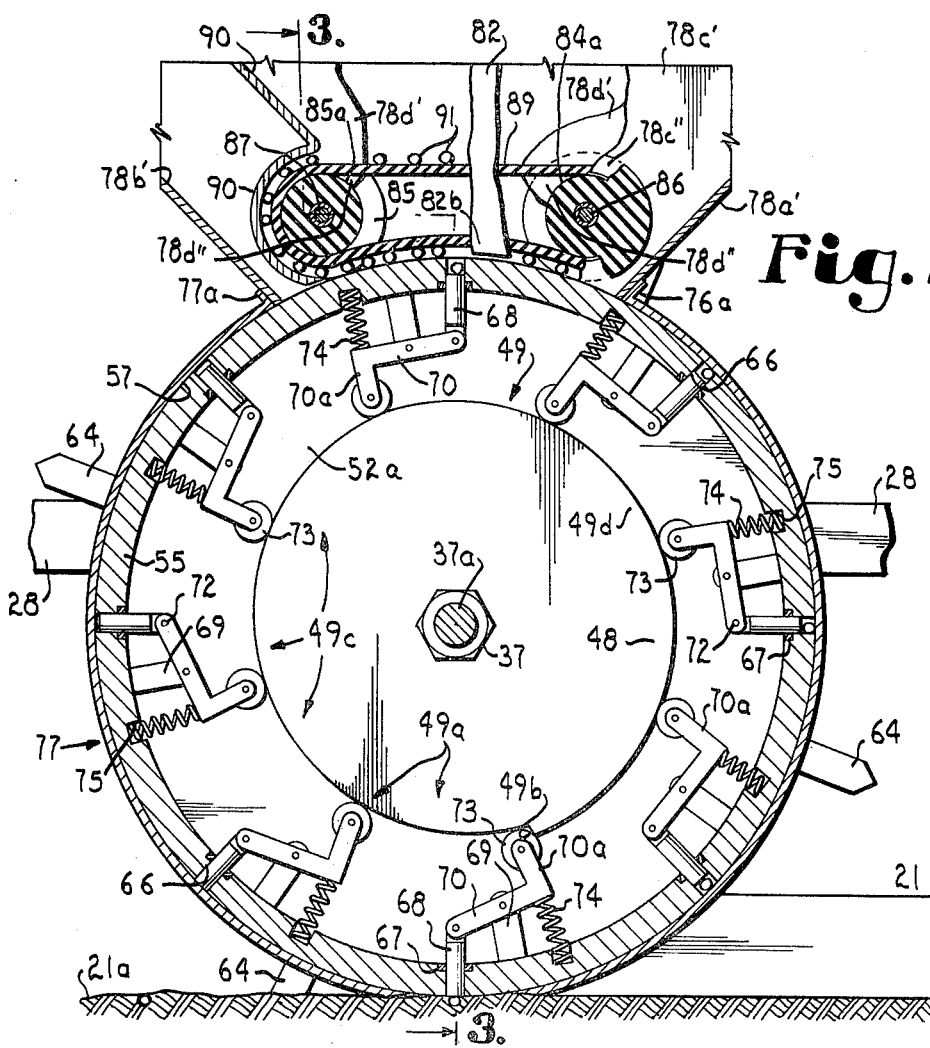
FIG. 2 is an enlarged, side vertical section of the planting device and the lower portion of the hopper thereabove with parts cut away in the view.
Figure 3:
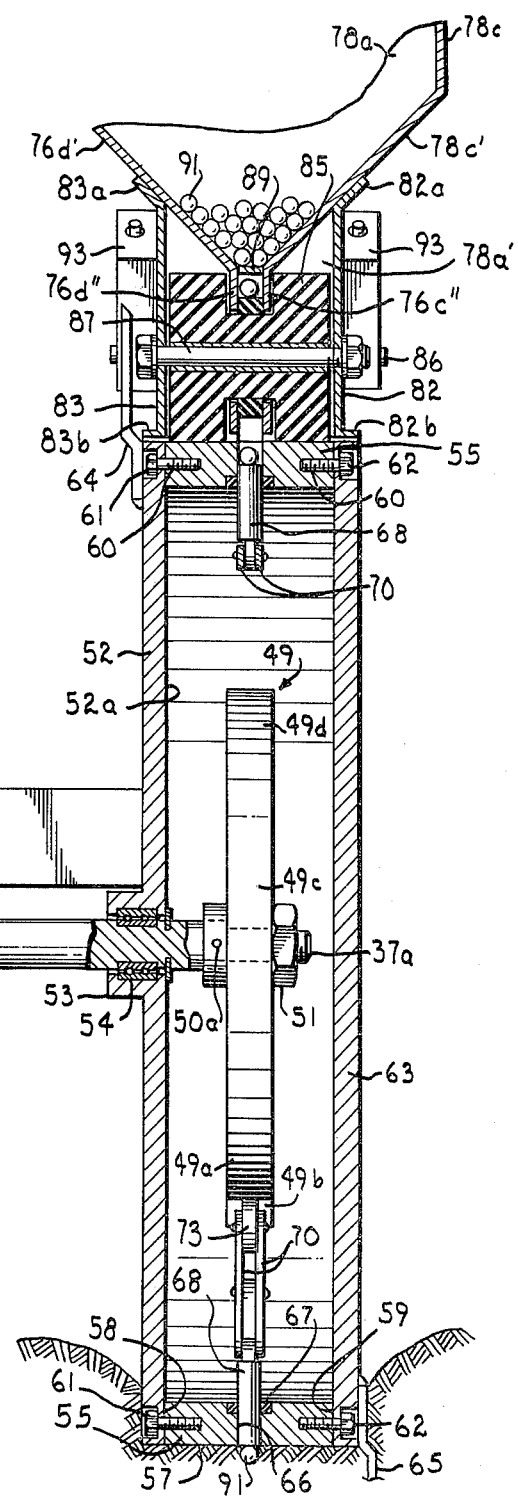
FIG. 3 is a view taken along the lines 3—3 of FIG. 2 in the direction of the arrows.

Referring, then, to FIGS. 2 and 3, shaft 37 has a reduced diameter end 37a upon which is mounted a cam 48 which has a cam surface generally designated 49 on the peripheral edge thereof. Cam surface 49 is roughly circular, running from a least radius zone 49a (which extends along an arc of about 45° from the singularity or drop off 49b) to a gradually increasing radius zone 49c. Zone 49c extends over an arc of about 60° to 90° with the cam surface 49d, thereafter, in the view of FIG. 2, being of maximum and uniform radius until the drop off or singularity 49b. Cam disc 48 is removably secured on shaft portion 37a by collar 50 fixed on the larger diameter portion of shaft 37 by set screws 50a and nut 51 which is removably threaded on the externally threaded shaft portion 37a.

Shaft 37 does not rotate with respect to the frame, being fixed relative thereto by set screws 38 and 39 (FIG. 3) and cam disc 48 is rigidly on shaft 37 and thus does not rotate with respect to the frame, either.

The planting device which operates to individually receive, carry and eject seeds therefrom for planting comprises a wheel which is rotatably mounted on shaft 37. This wheel is made up of three basic elements. The first of these, circular plate 52, makes up the inboard (with respect to the frame) wall of the wheel and has central fitting 53 therethrough which carries any conventional bearing unit 54 which permits rotation of plate 52 around cylindrical shaft 37 and limits lateral movement of plate 52 on shaft 37. A cylindrical rim 55 has an inboard or radially inwardly facing surface 56 and an outboard or radially outwardly facing surface 57 with parallel side edges 58 and 59. Internally threaded bores or recesses 60 through edges 58 and 59 removably receive therewithin bolts 61 which removably fix rim 55 to the inner surface 52a of plate 52 at the outboard periphery thereof and bolts 62 likewise removably fixing outboard circular plate 63 to the rim 55 outboard (with respect to the frame) face or edge 59.

A plurality of cleats or spikes 64 (inboard) and 65 (outboard) are fixed to plates 52 and 63, respectively, at radially spaced positions therearound in order to force rotation of the wheel made up of plates 52 and 63 and rim 55 when the frame is pulled along the ground. Such motion is typically upward in FIG. 4 and to the right in FIG. 1, as well as to the right in FIG. 2, whereby the wheel rotates clockwise in the views of FIGS. 1 and 2.

Centrally positioned of rim 55 are a plurality of cylindrical bores or openings 66 which extend entirely through rim 55 and are spaced equidistant from one another around said rim 55. Typically, bores 66 have O-ring or seal retaining grooves 67 associated therewith at the inboard ends thereof. The internal diameter of bores 66 is preferably only slightly greater than the greatest outer diameter of the seeds to be planted from the planting device.

Each bore 66 receives a reciprocable plunger 68 therewithin which slidingly and frictionally moves radially inwardly and outwardly of the bores 66 in operation of the planter, as will be described. Adjacent each bore 66 there is provided a support 69 which is welded or otherwise fixedly attached to the inside surface 56 of rim 55. L-shaped members (in side view as in FIG. 2) 70 are pivotally connected by pins 71 to supports 69 centrally of the long L-leg, as well as being pivotally connected by pins 72 at one end thereof to pistons 68. At the other end of members 70 there are provided cam follower portions 70a which may or may not have cam follower wheels 73 associated therewith. (Thus, if the manufacturer will case harden the peripheral surface of cam 48 and the bearing ends of cam follower portions 70a, wheels 73 are not necessary.) Spring means 74, received in recesses 75 on the inner surface 56 of rim 55, continually force the cam follower portions 70a of members 70 toward the cam surface 49 and into contact therewith.

The spacing of openings or bores 66 from one another is determined by the desired spacing of the seeds from one another when planted in the earth furrow 21a. Thus, depending upon the crop, the openings or bores 66 may be spaced closer to one another or farther away from one another. In order to achieve a closer spacing, the cam 48 may be broadened and the piston operating means (69, 70, etc.) may be staggered with respect to one another on the rim 55. The diameter of the wheel may be varied for convenience in spacing of the openings 66 as well and, in such case, it is merely necessary to adjust the diameter of the cam 48 with respect thereto, as well as the seed ejection means.

Completing the description of the seed planting device (exclusive of the means for feeding seeds to the planter), there are provided (in direction of motion of the frame) front and rear enclosing arcuate seed retainer means 76 and 77, respectively. Retainers 76, 77 each comprise arcuate sheets or shields which fit in frictional, seed retaining contact downwardly over the rim 55 and the outer surface 57 thereof as the wheel rotates on shaft 37. Retainers 76 and 77 each have, respectively, upper ends 76a and 77a which are fixed or attached removably to the seed hopper (to be described) by bolts or other means and, additionally, are typically secured by suitable structurals to the frame members 29 and 32. Arcuate seed retainers 76 and 77 additionally have lower tapered ends 76b and 77b, respectively which ends may be spaced apart a distance several times the diameter of the bores 66 or only slightly further apart than the diameter of said bores for precision planting.

It is noted the wheel does not rotate because of the frictional contact with the earth at the lower portion thereof, during rotation, but rather because it is driven by the impaling of the ground by the spikes 64 and 65. Therefore, the seed retainer plates or sheets may closely approach one another at their lower ends 76b and 77b, whereby the seeds are retained within the bores 66 until the seeds are discharged therefrom by action of plungers 68. The close following of the tapered sheet end 77b after end 76b operates to ensure that any mud or dirt picked up by the periphery of rim 55 on its outer surface 57 is scraped off while the plungers 68 are in their radially outward position, thus to have a clean outer rim surface 57 on the return upwardly to the seed receiving position.

There remains to be described the means for storing and carrying seeds for each seed planter module which typically comprises a hopper carried by the frame over the seed planter wheel just described and, further, the means for individually segregating, carrying and feeding seeds to be planted to the openings or bores in the seed planting wheel as they are presented for filling on the upward side of their rotation as the frame moves over the ground in the planting process.

FIG. 4 shows at 78, in dotted lines, a typical hopper outline positioned above the seed planting wheel just described. Such hopper whould have front walls 78a, rear wall 78b and side walls 78c and d. The top of the hopper would carry, in use, a removable conventional top 79. Any suitable combination of framework such as a horizontal square frame 80, mounted by laterally and downwardly angled structurals 81 connecting to longitudinal frame members 22 and 28, may be employed to receive and carry the hopper box 78. The hopper front and rear wall portions are inwardly formed at the lower portions thereof as seen at 78a' and 78b'. Likewise, as seen in FIG. 3, the hopper 78 side walls are inwardly angled and formed in the lower portions thereof as seen at 78c' and 78d', respectively.

Referring particularly to FIG. 3, attached to the inwardly sloping wall portions 78c' and 78d' are two elongate plates or sheets 82 and 83 which are outwardly angled at their upper ends 82a and 83a for attachment to walls 78c' and 78d' and outwardly flanged at right angles at the lower ends 82b and 83b thereof (arcuately) thereby to closely overlie the wheel defining plates 63 and 52, respectively. Plates 82 and 83 are fixed and connected to the wall portions 78a' and 78b' and are closed thereby at the ends thereof.

A pair of rubber or resilient plastic material wheels 84 (front) and 85 (rear) are rotatably mounted on removable shafts 86 and 87 mounted in openings provided in plates or walls 82 and 83. Shaft 86 is received in slotted openings 88 in walls 82 and 83, there being provided spring means (FIG. 1) 89 in housings 90 mounted on walls 82 and 83 to resiliently bias shaft 86 downwardly and to the right in FIG. 2 for belt tightening purposes. Centrally of each of the resilient rollers 84 and 85, same are recessed as at 84a and 85a whereby to receive thereover and therearound both the endless resilient (rubber or plastic) belt 89 and, in close but noncontacting encirclement, downwardly extending portions 78c'' and 78d'' of wall portions 78c' and 78d'.

In order to complete a restricted path which encloses the belt 89 rearwardly of the central portion 85a of roller 85 and laterally of belt 89 in its travel over, around and under the roller portions 84a and 85a, a rearmost wall 90 (particularly see upper lefthand corner of FIG. 2) is provided within the hopper 78 inboard of the rearmost wall portions 78b' and 78b thereof.

The rollers 84 and 85 are driven in rotation (counterclockwise rotation in the view of FIG. 2) by their continuous frictional contact with the outer surface 57 of rim 55 of the wheel as it is forced in rotation during forward movement of the frame by spikes 64 and 65 engaging the ground. Belt 89 is of resilient material such as rubber or plastic and preferably has an outer spongy surface as of sponge rubber or plastic for receiving and carrying and permitting some compression thereinto of seeds 91.

In operation of the device, employing at least one and, optionally, a plurality of the planter modules of FIGS. 1 and 4 dragged by their connection to bar 17, pulled by a tractor, the hopper or hoppers of the modules are filled to greater or lesser depth with seeds (such as corn, soy beans, milo or the like). These seeds are directed first by parallel walls 78a–d, then the inwardly tapering walls 78a'–78d', inclusive and finally, by the walls 78a', 78c'', 78d'' and 90 directly onto the top of belt 89. The spacing of wall 78c'' with respect to wall 78d'' and the width of belt 89 are such that only one seed may fit on the belt which moves in counterclockwise direction in view of FIG. 2 and toward the viewer at the top of FIG. 3. Likewise, the spacing of the lower portion of wall 90 (toward belt 89) as it passes around the surface 85a and roller 85 is such that only the height clearance of a single seed is available. This assures that a row or sequence or series of single seeds emits from the bottom portion 90a of wall 90 into contact with the rim 55 outer surface 57. At this zone, both belt 89 and the rim 55 are moving in the same direction, namely, from left to right in FIG. 2. A continuous feed, thus, is presented to the outer surface 57 of rim 55 by the rotation of belt 89 and the rollers 84 and 85 in contact with the outer surface of rim 55, whereby individual seeds fall into each of the openings or bores 66 as they line up with the underside of the belt 89. These seeds are retained in central position on the rim 55 outer surface 57 by the lowermost portions of the walls 78c'' and 78d'' (FIG. 3) which closely approach, but do not contact the rim surface 57, opposite and close to the flanges 82b and 83b. Thus, the lower edges of wall portions 78c'' and 78d'' are arcuate to follow the configuration of the wheel. Excess seeds which do not go into the openings of rim 55 are recycled into the hopper to the right (in FIG. 2) of roller 85 and, by rotation thereof, are moved upwardly therepast to join the seed body in the hopper.

Thus it is seen that a device has been provided which ensures that each of the bores 66 is filled with seeds to be planted. The pistons 68 are retracted because the followers 73 are on the greater radius cam surface 49d as they approach the zone past rear wall portion 90a. As the filled bores 66 pass under roller 84, the seed retainer shield 76 ensures that the seeds are retained in the bores 66 until they pass the lower end 76b thereof. At this point, namely, past wall portion end 76b, the plungers 68 are thrust outwardly by cam followers 73 passing over singularity or drop 49b of cam 48, thus tamping the seed in the ground constituting the bottom of furrow 21a. The pistons 68 remain in their outermost position past wall portion 77b, thus making sure of a cleanoff of the outer face 57 of rim 55.

In operation of the seed feeding device with respect to the planting wheel, the surface of the belt 89 moves more slowly than the surface of the rim 55. Additionally, the seeds, as they pass around and under roller 85 and off lower wall portion 90a are already moving in the direction of motion of the wheel and rim 55 when contacted by the outer surface 57 of rim 55. This motion of a continuous, aligned, stream of seeds fed onto the surface of the rim 55 from belt 89 gives the seeds time to line up with the bores or orifices 66 and absolutely ensures that each bore receives the desired single seed. In this manner, the device does not require enlarged, seed receiving orifices into which several seeds may fall in order to ensure that each bore 66 is in fact charged. The device thus provides, always, sure and positive charging of the planting holes, bores or orifices 66. By providing the instant arrangement, the seeds have as much time to charge to the bores 66 as if the wheel was moving very slowly. Thus, because of this, it is possible to feed faster (at a faster rate of rotation of wheel 55) without a loss of sure seeding and accuracy.

Because the outside of roller wheels 84 and 85 are driven by the main wheel they move at the same rate. Because the belt 80 is recessed on lesser diameter central roller portion 84a and 84b it must move more slowly than the wheel. This ensures the desired relative rates of speed.

Any conventional furrow closing means such as, but not restricted to the discs 39 and 40 may be employed following the planting wheel for the purpose of closing the furrow. Specifically, any other sort of earth guiding means which will return the divided earth separated by the blade or furrow cutter 33 may be employed. Additionally, while the earth engaging spikes 64 and 65 are exceedingly positive and sure in action to force rotation of the planting wheel at a rate corresponding to the velocity at which the frame is being pulled over the ground being seeded, other means may be substituted therefor. That is, for example, the tamping wheel 48 may have positive ground engaging means provided thereon. With such moved to a position closely adjacent the seed planting wheel, any conventional means coupling the tamping wheel and planting wheel for drive therebetween may be employed to drive the seed planting wheel from the tamping wheel.

Further optionally, if gaskets be provided between rim 55 and plates 52 and 63, as well as an oil seal at the point of passage of shaft 37 through plate 52, the wheel may be grease or oil filled. In such case, additional conventional oil seals may be provided at the bores 66 sealing the action of the piston 68 against oil or grease leakage as well as dust and dirt input from the periphery of the wheel.

In the event it is desired to be able to seed rows or furrows under 10'' apart (typical furrow width may be up to 30'', commonly 20''), referring to FIG. 3, the slope of walls 78c' and 78d' need not be equal. By steepening wall 78c' and moving longitudinal member 22 closer to longitudinal members 28, 29 and 32, the width of the device can be reduced to conveniently handle such furrow width with a plurality of the seeding modules seen in FIGS. 1 and 4 connected closely adjacent to one another along member 17.

Close and cooperative function of the seed feeding means of the upper portions of FIGS. 2 and 3 with the seed planting wheel is important and critical for the operation of the device. Specifically, that is, the function of the seed feeding device is to continuously prepare a moving single line of seeds to be planted from the body of seeds carried in the hopper above the seed feeding device and the planting wheel. This stream of seeds, in single line, is continuously moving in the direction of rotation of the planting wheel as the seeds come into contact with the periphery of the wheel. Thus, while the belt 89 is rotating somewhat more slowly than the periphery of the rim 55, there is little frictional abrasion or the like as the seeds are then carried, continuously, by the belt and the motion of rim 55 across the contacting space to the right of flange portion 90a (FIG. 2) to the guide portion 76a and wall 78a' of the hopper.

In the event it is desired to stagger the bores 66 over a width of rim 55 wider than a single seed, the belt 89 width (and gap in wheels 84 and 85 carrying same) may be of greater width than a single seed so that a stream of seeds two abreast is carried by the belt 89 onto the rim 55. In this case, of course, edgewise planting of seeds would not be controllable, as is the case when but a single seed width belt, etc. is employed.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Means for mechanically planting seeds, comprising, in combination:

a frame adapted for connection to a trailer hitch, a non-rotating shaft fixedly mounted on said frame and extending at substantial right angles to the direction of forward movement thereof, a wheel rotatably mounted on one end of said shaft, said wheel hollow-centered and made up of a cylindrical rim member and inboard (with respect to the frame) and outboard circular plates removably fixed to said rim, the rotatable mounting of the wheel on the shaft comprising a bearing carried centrally on the inboard plate, the latter penetrated by the shaft, whereby the outboard shaft end is received inside of said wheel, a cam carried on the outboard end of the shaft within said wheel, means operatively associated with said wheel for ensuring rotation of the wheel on said shaft when the frame is pulled over the ground, a plurality of spaced openings provided through said rim around the periphery thereof, a plurality of plungers mounted on the inside of said wheel, one received in each said opening and adapted to reciprocate therewithin, means positioned within said wheel and cooperating with said cam for controlling the reciprocation of the several plungers with respect to one another, whereby each plunger is retracted radially inwardly except at the downward position and shortly following same, when each plunger is moved radially outwardly, forward (in the forward direction of motion of the frame) and rearward shield means each closely enclosing the wheel rim from closely adjacent the top center portion thereof to closely adjacent the bottom portion thereof, whereby to leave an upper center and a lower center portion of the wheel periphery free, a source of seeds to be planted by said wheel comprising a seed-carrying hopper mounted above the open upper center portion of the wheel, and means positioned within the lower portion of said hopper which operate to continuously produce a continuous, aligned stream of seeds which is continuously fed, as said aligned stream, onto the peripheral surface of the rim of said wheel in line with the openings therein, said last mentioned means continuously moving said aligned stream of seeds in the direction of rotation of the planting wheel as the seeds come into contact with the periphery of the rim thereof, said last mentioned means maintaining said aligned stream in moving contact with the moving rim peripheral surface substantially across the distance between the forward and rearward shield means at the top thereof, thereby ensuring sure and positive charging of the said wheel rim peripheral openings with seeds.

2. Means for mechanically planting seeds, comprising, in combination:

a frame adapted for connection to a trailer hitch, a non-rotating shaft fixedly mounted on said frame and extending at substantial right angles to the direction of forward movement thereof, a wheel rotatably mounted on one end of said shaft, said wheel hollow-centered and made up of a cylindrical rim member and inboard (with respect to the frame) and outboard circular plates removably fixed to said rim, the rotatable mounting of the wheel on the shaft comprising a bearing carried centrally on the inboard plate, the latter penetrated by the shaft, whereby the outboard shaft end is received inside of said wheel, a cam carried on the outboard end of the shaft within said wheel, means operatively associated with said wheel for ensuring rotation of the wheel on said shaft when the frame is pulled over the ground, a plurality of spaced openings provided through said rim around the periphery thereof, a plurality of plungers mounted on the inside of said wheel, one received in each said opening and adapted to reciprocate therewithin, means positioned within said wheel and cooperating with said cam for controlling the reciprocation of the several plungers with respect to one another, whereby each plunger is retracted radially inwardly except at the downward position and shortly following same, when each plunger is moved radially outwardly, forward (in the forward direction of motion of the frame) and rearward shield means each closely enclosing the wheel rim from closely adjacent the top center portion thereof to closely adjacent the bottom center portion thereof, whereby to leave an upper center and a lower center portion of the wheel periphery free, a source of seeds to be planted by said wheel, and means positioned above the free upper center portion of said wheel for individually feeding seeds to said rim openings as said wheel rotates, said source of seeds comprising a seed-carrying hopper mounted above the said open upper center portion of the wheel, the said means for individually feeding seeds positioned within the lower portion of said hopper and receiving seeds for feed therefrom for individual passage thereof into the openings in the wheel rim, the individual seed feeding means comprising a pair of spaced-apart rollers rotatably mounted over, riding against and driven by said rim, the rollers each centrally recessed to receive centrally thereon an endless belt adapted to carry individual seeds in sequence thereon, and means laterally enclosing said belt within said hopper for retaining seeds thereon and next thereto.

3. Means as in claim 2 including an arcuate seed retainer means for the rearward (in the direction of motion of the frame) roller cooperating with said lateral enclosing means, whereby to closely control the feed path of the seeds from the hopper, on the top and rear end of the belt as it passes around the rear roller, onto the rim of the wheel.

* * * * *